(12) United States Patent
Kajiyama et al.

(10) Patent No.: US 6,435,441 B1
(45) Date of Patent: Aug. 20, 2002

(54) SEAT BELT RETRACTOR

(75) Inventors: Hiroshi Kajiyama; Hiroaki Fujii, both of Shiga (JP)

(73) Assignee: Takata Corporation, Shiga (JP)

(*) Notice: Subject to any disclaimer, the term of this patent is extended or adjusted under 35 U.S.C. 154(b) by 0 days.

(21) Appl. No.: 09/640,664

(22) Filed: Aug. 18, 2000

Related U.S. Application Data

(60) Provisional application No. 60/149,431, filed on Aug. 18, 1999.

(51) Int. Cl.⁷ .............................................. B60R 22/28
(52) U.S. Cl. ................... 242/379.1; 280/805; 280/806; 180/268
(58) Field of Search .............................. 242/379.1, 374; 280/806, 805; 297/470, 471, 472, 478; 180/268

(56) References Cited

U.S. PATENT DOCUMENTS

| | | | | |
|---|---|---|---|---|
| 5,667,246 A | * | 9/1997 | Miller | 280/806 |
| 6,206,315 B1 | * | 3/2001 | Wier | 242/379.1 |
| 6,241,172 B1 | * | 6/2001 | Fugel et al. | 242/379.1 |
| 6,267,314 B1 | * | 7/2001 | Singer et al. | 242/379.1 |

* cited by examiner

*Primary Examiner*—John M. Jillions
(74) *Attorney, Agent, or Firm*—Foley & Lardner

(57) ABSTRACT

A mechanism for changing the restriction load placed on a seatbelt is provided. The mechanism restricts the load placed upon the seatbelt by a torsion bar capable of twisting and deformation that the rotation of the locking member in the direction of the seatbelt is obstructed and the spool rotates relative to the extracting direction of the seatbelt as to the locking member.

14 Claims, 4 Drawing Sheets

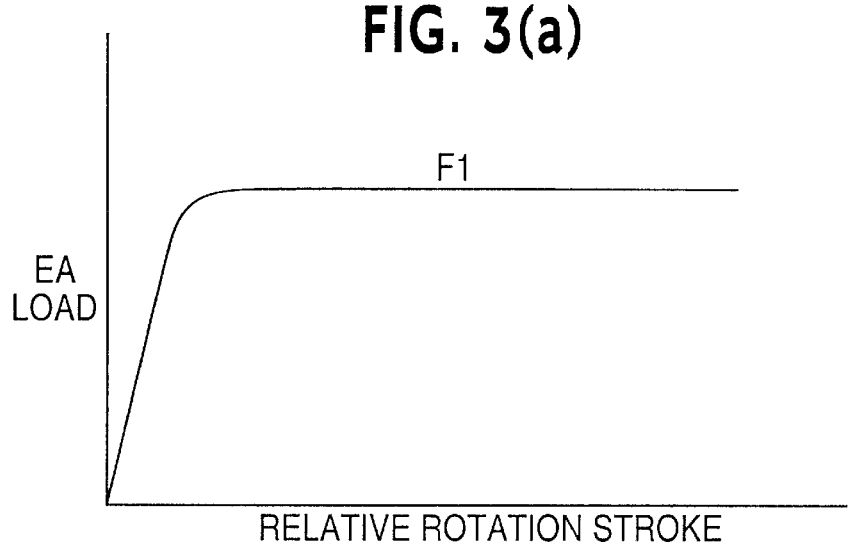
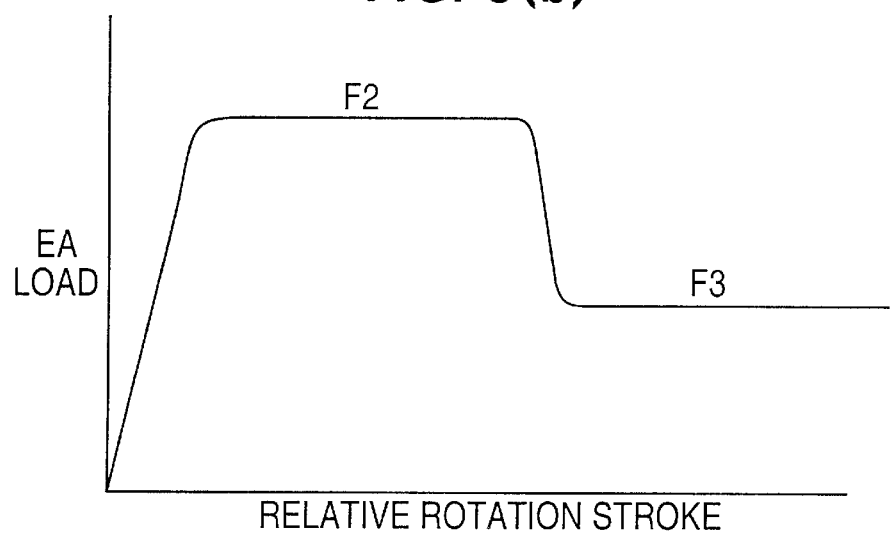

SEAT BELT RETRACTOR

This application is related to Provisional Application No. 60/149,431, filed on Aug. 18, 1999, the disclosure of which is hereby incorporated by reference in it entirety.

FIELD OF THE INVENTION

The present invention relates to a seatbelt retractor that takes up a seatbelt so as to be windable and extractable, and particularly relates to the technical field of a seatbelt retractor having a belt load restricting mechanism (hereafter also referred to as an "energy absorbing" or EA mechanism) which restricts the load placed on a seatbelt in the event of an emergency such as great vehicular deceleration occurring due to a collision or the like with the seatbelt being worn, by means of a torsion bar twisting and/or deforming.

BACKGROUND OF THE INVENTION

Conventionally, seatbelt devices provided to vehicles such as automobiles restrain the passengers with seatbelts in the event of emergencies such as described above, thereby preventing passengers from flying out of their seats, thus protecting the passengers.

Such seatbelt devices have seatbelt retractors for taking up the seatbelt. The seatbelt retractor is arranged so that if the seatbelt is not being worn the seatbelt is taken up on the spool, and if the seatbelt is worn, the seatbelt is extracted and worn by the passenger. Further the seatbelt retractor is arranged such that a lock mechanism operates in the event of an emergency such as described above which obstructs the rotation of the spool in the direction of extracting the seatbelt, thereby obstructing extracting of the seatbelt. Thus, the seatbelt restrains and protects the passenger in a sure manner in the event of an emergency.

With seatbelt retractors in conventional seatbelt devices, a great vehicular deceleration occurs at the time of the seatbelt restraining and protecting the passengers in an emergency such as a collision of the vehicle or the like. In this situation, great inertia moves the passengers forwards. Accordingly, a great load is placed on the seatbelt and the passenger is subjected to a great shock force from the seatbelt. This shock force on the passenger is not particularly a problem, but preferably should be restricted, if possible, in different circumstances.

Accordingly, conventional seatbelt retractors have been developed with a torsion bar, so as to restrict the load placed upon the seatbelt in the event of an emergency when the seatbelt is being worn.

FIG. 4 is a cross-sectional diagram illustrating an example of a seatbelt retractor having such a torsion bar. In the Figure, reference numeral 1 denotes a seatbelt retractor, 2 denotes a frame in the shape of a box with one end open, 3 denotes a seatbelt, 4 denotes a spool which is rotatably supported by both side walls of the frame 2 in the shape of a box with one end open and which takes up the seatbelt 3, 5 denotes deceleration detecting means which detect greater vehicular deceleration generated in the event of an emergency such as described above and operates accordingly, 6 denotes a lock mechanism which operates due to the deceleration detecting means 5 and at least obstructs rotation of the spool 4 in the direction of extracting the seatbelt, 7 denotes a torsion bar which is movably fit and passed through the center of the spool 4 in the axial direction and which rotationally links the spool 4 and the lock mechanism 6 (this being equivalent to the seatbelt load restricting mechanism in the present invention), 8 denotes spring means for constantly pressing the spool 4 in the direction of taking up the seatbelt by the spring force of a spiral spring 9 via a bushing 10, 11 denotes a pretensioner which generates belt take-up torque by operating in the event of an emergency such as described above, and 12 is a bushing for transmitting the seatbelt take-up torque from the pretensioner 11 to the spool 4.

The lock mechanism 6 is provided with a locking base 14 (this being equivalent to the locking member in the present invention) which is capable of integrally rotating with a later-described first torque transmitting shaft 17 of the torsion bar 7 and holds a pawl 13 in a manner capable of locking, and the torsion bar 7 is provided with a lock gear 6a which normally integrally rotates with the torsion bar 7 but stops in the event of an emergency by the operation of the deceleration detecting means 5 and generates a relative rotational difference with the torsion bar 7 and engages the pawl 13 with inner teeth 19 on the side wall of the frame 2 so as to obstruct rotation of the locking base 14, that is the spool 4, in the direction of extracting the seatbelt. A male screw shaft portion 15 is formed to the locking base 14, and a nut-shaped stopper member 16 which integrally rotates with the spool 4 is screwed to this male screw shaft portion 15.

Also, a first torque transmitting portion 17 which engages the locking base 14 in a manner incapable of relative rotation is formed to the torsion bar 7, and a second torque transmitting portion 18 is formed which engages the spool 4 in a manner incapable of relative rotation.

Then, the spool 4 is constantly pressed by the spring force of the spring means 8 in the direction of taking up the seatbelt, via the bushing 10, torsion bar 7, second torque transmitting portion 18 of the torsion bar 7, and the bushing 12. Also, in the event of the pretensioner 11 operating, the belt take-up torque generated at the pretensioner 11 is transmitted to the spool 4 via the bushing 12, and thus the spool 4 takes up a predetermined 10 amount of the seatbelt 3.

With conventional seatbelt retractors 1 thus configured, the seatbelt 3 is completely taken up by the pressing force of the spring means 8 when the seatbelt is not being worn.

Extracting the seatbelt 3 at a normal speed for wearing causes the spool 4 to rotate in the seatbelt extracting direction, which allows the seatbelt 3 to be extracted smoothly. An unshown tongue slidably provided to the seatbelt 3 is inserted to and retained by a buckle fixed to the vehicle body, following which the portion of the seatbelt 3 which has been excessively extracted is taken up by the spool 4 by the pressing force of the spring means 8, and the seatbelt 3 is fit to the extent that the passenger does not feel too tight.

In the event of an emergency such as described above, the seatbelt take-up torque generated by the pretensioner 11 is transmitted to the spool 4, and the spool 4 takes up the seatbelt 3 by a predetermined amount, thereby securely restraining the passenger. On the other hand, under great vehicular deceleration generated in the event of an emergency, the deceleration detecting means 5 operates and the lock mechanism 6 operates. That is, the rotation of the lock gear 6a in the direction of extracting the seatbelt is obstructed by the operation of the deceleration detecting means 5, and the pawl 13 of the lock mechanism 6 rotates and engages the inner teeth 16 of the side wall of the frame 2. This obstructs the rotation of the locking base 14 in the direction of extracting the seatbelt, so the torsion bar 7 is twisted, and the spool 4 alone rotates in the direction of extracting the seatbelt relatively to the locking base 14. Subsequently, the spool 4 rotates in the direction of extracting the seatbelt while twisting the torsion bar 7, so the load placed on the seatbelt 3 is restricted by the twisting torque of this torsion bar 7, thus at least partially absorbing and alleviating the shock which the passenger is subjected to.

The relative rotation of the spool 4 as to the locking base 14 causes the stopper member 16 which integrally rotates with the spool 4 to relatively rotate as to the male screw shaft portion 15 to which it is screwed, and thus to move in the direction of the locking base 14. Then, at the point that the stopper member 16 abuts against the locking base 14, further rotation of the stopper member 16 is obstructed, so the rotation of the spool 4 is also obstructed, and twisting of the torsion bar 7 stops. Thus, the extracting of the seatbelt 3 is obstructed and the passenger is restrained by the seatbelt 3 in a more sure manner, while the maximum twisting of the torsion bar 7 is restricted and severing of the torsion bar 7 due to twisting is prevented.

Also, this conventional seatbelt retractor 1 is arranged so that the rocking base 14 of the lock mechanism 6 relatively rotates in the direction of extracting the seatbelt as to the lock gear 6a in the event that the seatbelt is rapidly extracted, and accordingly the pawl 13 of the lock mechanism 6 engages the inner teeth 19 of the side wall of the frame 2 in the same manner as above, thereby obstructing the rotation of the locking base 14, so the rotation of the spool 4 in the direction of extracting is obstructed via the torsion bar 7, and extracting of the seatbelt is obstructed.

Now, with such a conventional seatbelt retractor 1, a single restriction load is set by the torsion bar 7 alone, and the motion energy of the passenger is absorbed by only this one restriction load. However, in the event of restraining the passenger in cooperation with attached restraining means such as the above-described pretensioner 11 or other restraining/protecting means such as an unshown airbag, the restraining states of the passenger differ in various manners. Restraining the passenger in a more effective and appropriate manner is difficult with only one restriction load in such cases.

SUMMARY OF THE INVENTION

The present invention has been made in light of such, and it is an object thereof to provide a seatbelt retractor wherein the restriction load placed on the seatbelt can be flexibly set variously according to the particular emergency being experienced at the time.

In order to solve the above problems, the invention is a seatbelt retractor comprising at least: a spool for taking up a seatbelt; a lock mechanism having a locking member whereby rotation in the direction of extracting the seatbelt is obstructed in the event of an emergency; a torsion bar rotatably linking between the spool and the locking member, and capable of being twisting deformed; and a seatbelt load restricting mechanism for restricting the load placed upon the seatbelt by means of the torsion bar twisting deforming at the time that the rotation of the locking member in the direction of the seatbelt being extracted is obstructed and the spool rotates relative to the extracting direction of the seatbelt as to the locking member; wherein the seatbelt load restricting mechanism further changes the restriction load to be restricted for the seatbelt in multiple steps, in relation to the operation of at least one of a pretensioner and an airbag.

Also, the invention is characterized in that the restriction load has the maximum restriction load thereof set at the beginning following starting of operation of the seatbelt load restricting mechanism or set partway through the plurality of steps, and is set to the minimal restriction load from the twisting deformation of the torsion bar at the time of operation of at least one of the pretensioner and the airbag.

Further, the invention is characterized in that the stroke of the spool in the restriction load of each step at the time of relative rotation is set so as to be different in at least part of the steps.

Further, the invention is characterized in that the seatbelt load restricting mechanism further comprises, in addition to the above torsion bar, a second torsion bar that twist-deforms at the time of relative rotation of the spool, wherein the restriction load changes in steps by means of the second torsion bar breaking before the twisting deforming of the first torsion bar completing at the time of operation of at least one of the pretensioner and the airbag.

Further, the invention is characterized in that the seatbelt load restricting mechanism further comprises a restriction load switchover mechanism for performing switchover control of the portion where the second torsion bar twist-deforms in a predetermined number of steps, wherein the restriction load changes in steps by means of the portion of the second torsion bar, which twist-deforms to the end, breaking before the twisting deforming of the first torsion bar completing at the time of operation of at least one of the pretensioner and the airbag.

With the seatbelt retractor according to the present invention thus configured, the restriction load for restricting on the seatbelt changes in multiple steps, such as in relation to operation of at least one of the pretensioner and airbag, by the seatbelt load restricting mechanism. Accordingly, the restriction load placed on the seatbelt can be flexibly set variously according to the required state at the time of emergency. That is to say, for example, in the event of restraining the passenger in cooperation with at least one of the pretensioner and the airbag, the restriction load placed on the seatbelt can be adjusted more appropriately in accordance with the operation of at least one of the pretensioner and the airbag, by adjusting the restriction load placed n the seatbelt. For example, it may be desirable to increase the initial restriction of the passenger with the seatbelt at the initial period such as the period before the effects of the pretensioner and airbag occur, and then relieving the restriction of the passenger with the seatbelt at a later period such as the period wherein the effects of the pretensioner and airbag occur, for example.

Accordingly, the restriction load can be adjusted variously according to the restriction state of the passenger, thereby restraining the passenger in a more effective and appropriate manner.

BRIEF DESCRIPTION OF THE DRAWINGS

FIG. 3 describes the EA load properties of this example in two different situations, one situation in FIG. 3(*a*) and the other situation in FIG. 3(*b*).

DETAILED DESCRIPTION OF THE PREFERRED EMBODIMENTS

The following is a description of embodiments of the present invention with reference to the drawings.

Figure 1:
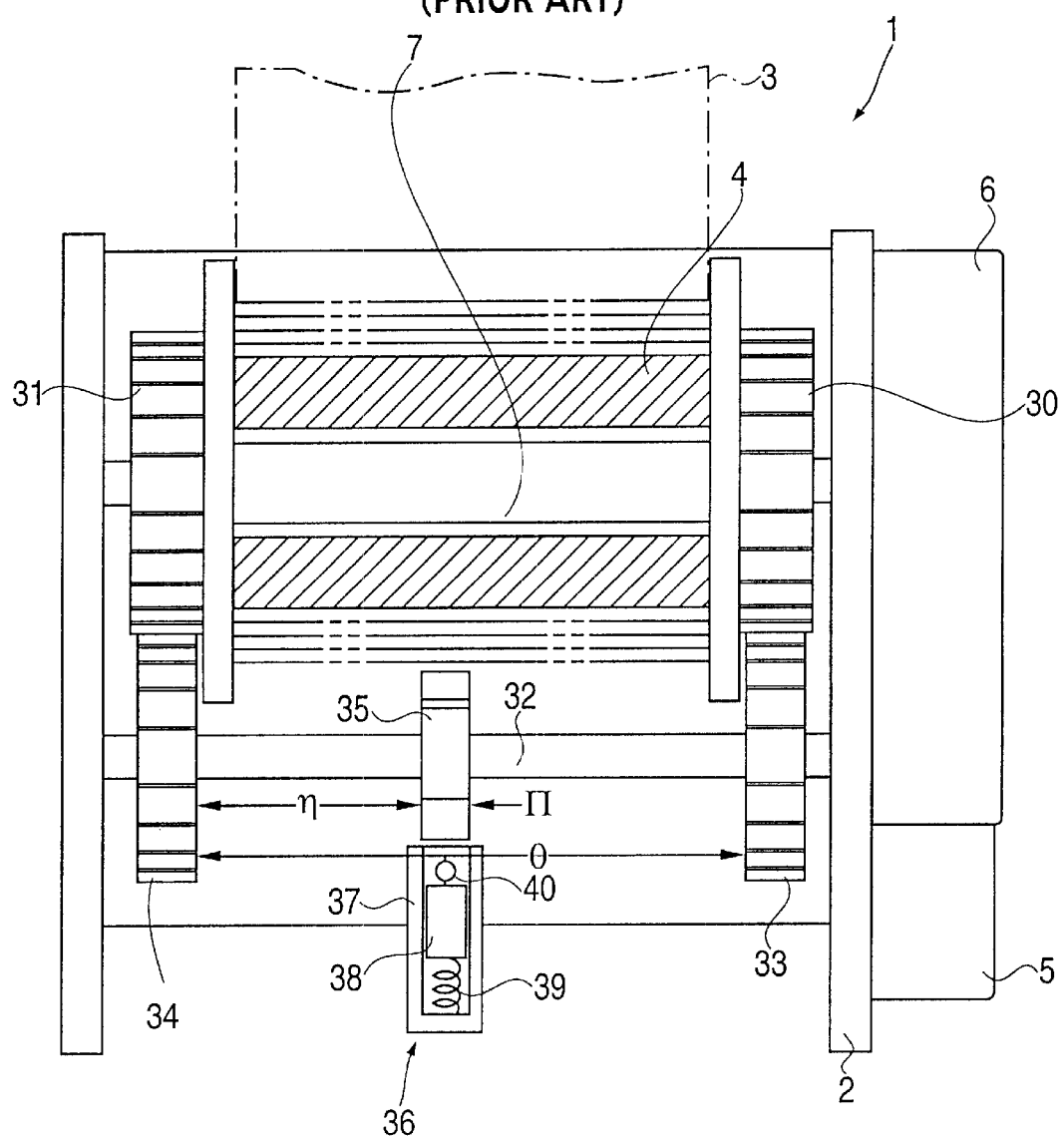
FIG. 1 is a cut-away diagram illustrating an example of an embodiment of the seatbelt retractor according to the present invention.
Figure 4:
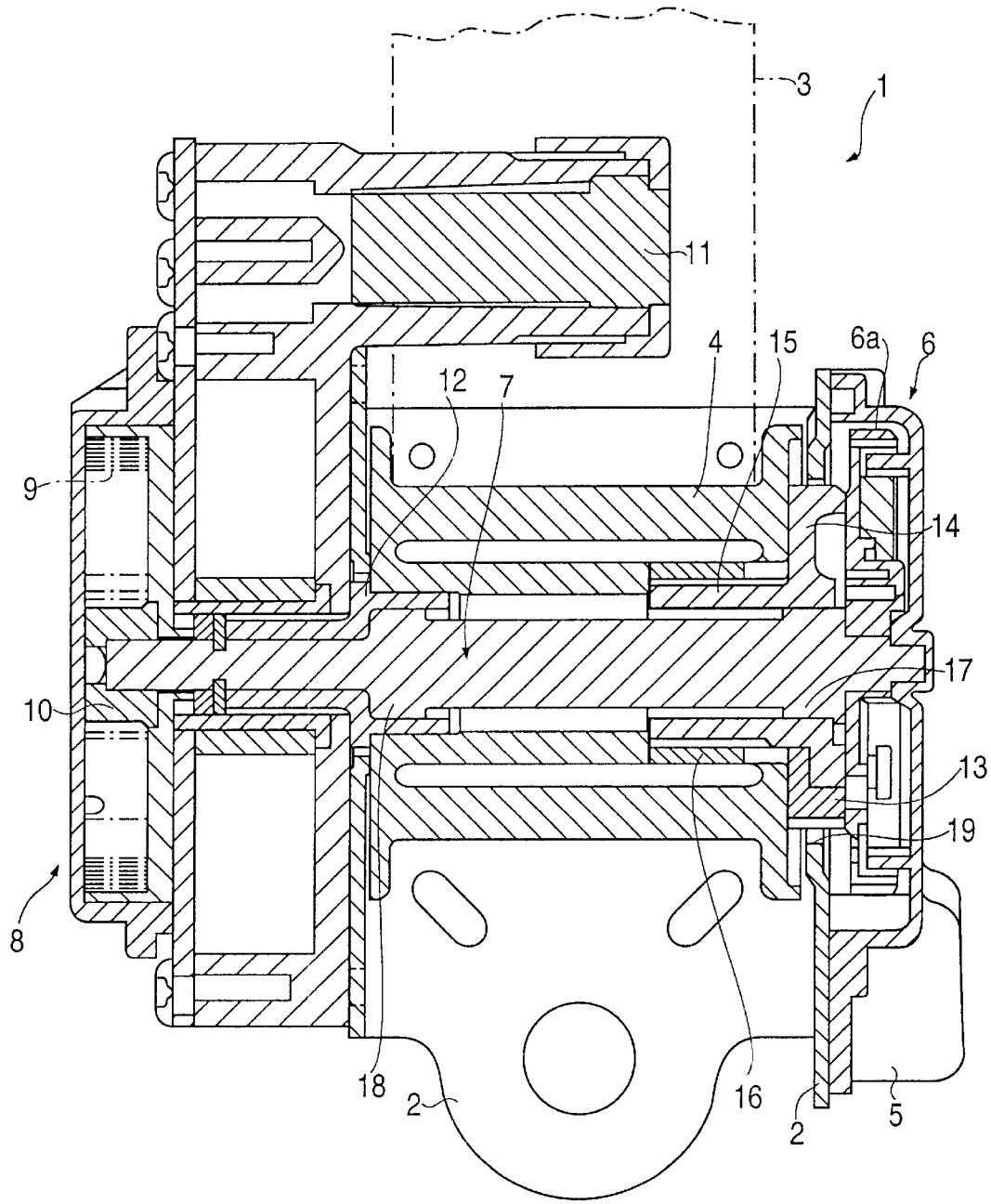
FIG. 4 is a cross-sectional diagram illustrating an example of a seatbelt retractor provided with a conventional torsion bar.

FIG. 1 is a diagram illustrating an example of an embodiment of the seatbelt retractor according to the present invention, with a portion of the configuration thereof omitted. The components that are the same as the components of the conventional seatbelt retractor 1 shown in FIG. 4 are denoted with the same reference numerals, and a detailed description is omitted because these features were described above.

As shown in FIG. 1, the seatbelt retractor 1 according to this example has a first gear 30 provided to the perimeter of the locking base 14 so as to integrally rotate with the locking base 14, and a second gear 31 is provided to the perimeter of a first extended shaft of the spool 4 so as to integrally rotate with the first extended shaft (i.e., the spool 4).

Further, a second torsion bar 32 is provided to the frame 2, rotatably and parallel to the torsion bar 7 (hereafter referred to as "first torsion bar 7" in the description of this example) so as to not interfere with the spool 4. A third gear 33 is provided to the edge of the lock mechanism 6 of the second torsion bar 32 in a manner incapable of relative rotation with the second torsion bar 32, and this third gear 33 is constantly meshed with the first gear 30. Also, a fourth gear 34 is provided to the edge of the spring means 8 of the second torsion bar 32 in a manner capable of relative rotation with the second torsion bar 32, and this fourth gear 34 is constantly meshed with the second gear 31.

Figure 2A:
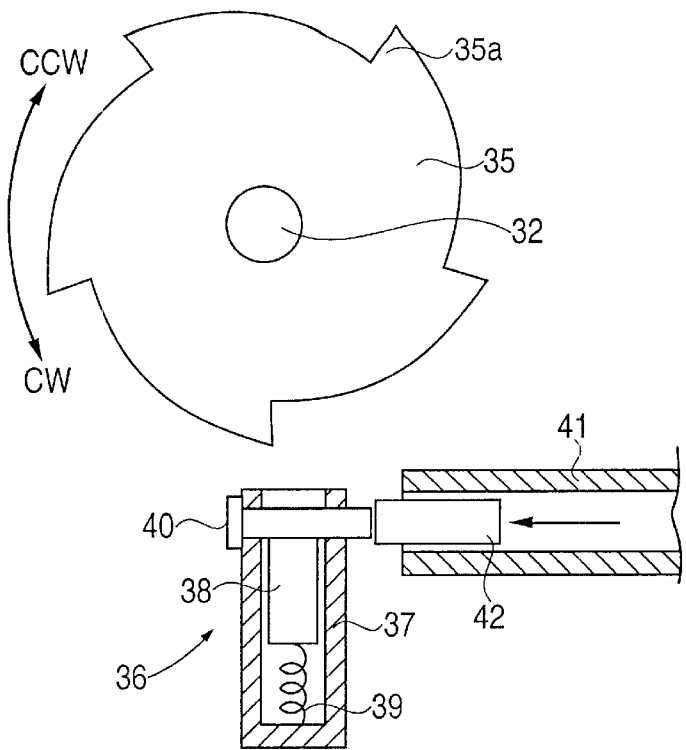
FIG. 2 describes the operation of this example as viewed from the direction II in FIG. 1, with (a) being a diagram illustrating the state wherein the lock member is non-operative and (b) being a diagram illustrating the state wherein the lock member is operative.

Further, a lock wheel 35 is provided to the second torsion bar 32 in a manner capable of relative rotation with the second torsion bar 32, and is positioned between the third and fourth gears 33 and 34. As shown in FIG. 2(a), a predetermined number (five in the example shown) of ratchet claws 35a are provided to the perimeter of the lock wheel 35, at equal intervals in the circumference direction. Also, an EA load switchover mechanism 36 is provided facing the outer perimeter surface of the lock wheel 35, this EA load switchover mechanism 36 being configured of a cylinder member 37, a lock member 38 provided slidably within the cylinder member 37 and capable of engaging the ratchet claws 35a of the lock wheel 35, a spring 39 for constantly pressing the lock member 38 upwards, a lock pin 40 which is provided to the cylinder member 37 so as to be movable in the longitudinal direction thereof (the vertical direction in the Figure) and hold the lock member 38 at a non-engaging position where there is no engaging with the ratchet claws 35a shown in FIG. 2(a) so as to prevent flying out of the cylinder member 37, a guide tube 41 for guiding exhaust gas from the pretensioner 11 (see FIG. 4) for operating this lock pin 40, and a piston 42 which is operated by the exhaust gas guided by the guide tube 41 for ejecting the lock pin 40 from the cylinder member 37.

Then, the lock mechanism 38 is normally held at a non-engaging position shown in FIG. 2(a) by the lock pin 40 and there is no engaging with the ratchet claws 35a of the lock wheel 35. In the event of a vehicle collision of a magnitude wherein the pretensioner 11 operates, the lock pin 40 is ejected from the cylinder member 37 and thus is set in the engaging position shown in FIG. 2(b) by the spring force of the spring 39, so as to be able to engage the ratchet claws 35a of the lock wheel 35.

Then, the second torsion bar 32 is designed so as to not break in the event of twisting and deforming over the entire length thereof even when the twisting and deforming of the first torsion bar 7 ends, and so as to break before the twisting and deforming of the first torsion bar 7 ends in the event of twisting and deforming on the portion of the second torsion bar 32 between the lock wheel 35 and fourth gear 34 only.

Now, with this example, the pretensioner 11 does not operate for small collisions of a magnitude wherein the unshown airbag apparatus does not operate. However, in the event of a collision of a magnitude wherein the airbag device does operate, an operation control signal supplied to this airbag device is also supplied to this pretensioner, so that the pretensioner operates along with the airbag device.

Another configuration of the seatbelt retractor 1 according to this example is the same except for the conventional seatbelt retractor 1 shown in FIG. 4 not being provided with a male screw shaft portion 15 for the locking base 14 and a stopper member 16 thereof.

With the seatbelt retractor 1 according to this example thus configured, the lock mechanism 38 is normally held at a non-engaging position shown in FIG. 2(a) where there is no engaging with the ratchet claws 35a, so the lock wheel 35 is capable of rotation in both the belt extracting direction CW and belt take-up direction CCW.

In the event of small collisions of a magnitude wherein the pretensioner or airbag do not operate, the pretensioner 11 does not generate exhaust gas, so the piston 42 does not move. Accordingly, the lock pin 39 also is not ejected from the cylinder member 37, so the lock member 38 is maintained at the non-engaging position. Thus, the lock wheel 35 is capable of rotation in both the belt extracting direction CW and belt take-up direction CCW.

The collision obstructs rotation of the locking base 14 in the belt extracting direction CW with the lock mechanism 6, so rotation of the first and third gears 30 and 33 is restricted by the inertial of the passenger due to this collision, so the spool 4 rotates in the belt extracting direction CW and the first torsion bar 7 twists. The third gear 34 rotates via the second gear 31 due to the rotation of this spool 4, so the second torsion bar 32 twists. Thus, the EA operation by the EA mechanism starts. At this time, the lock wheel 35 is free to rotate, so the second torsion bar 32 twists over the entire length θ thereof. Then, the second torsion bar 32 twists without breaking until the twisting operation of the first torsion bar 7 ends. Accordingly, the EA load properties of the EA mechanism in this example at this time are a totaled constant load F1 of the EA loads of the first and second torsion bars 7 and 32, as shown in FIG. 3(a).

Also, in the event of great collisions of a magnitude wherein the pretensioner 11 and the airbag both operate, the pretensioner 11 generates exhaust gas. As with conventional seatbelt retractors, the spool 4 is rotated in the belt take-up direction CCW by a predetermined amount due to the exhaust gas from the pretensioner 11, and the seatbelt is taken up by a certain amount. Accordingly, the belt tension increased by a predetermined amount, and the passenger is restrained in a relatively secure manner.

Figure 2B:
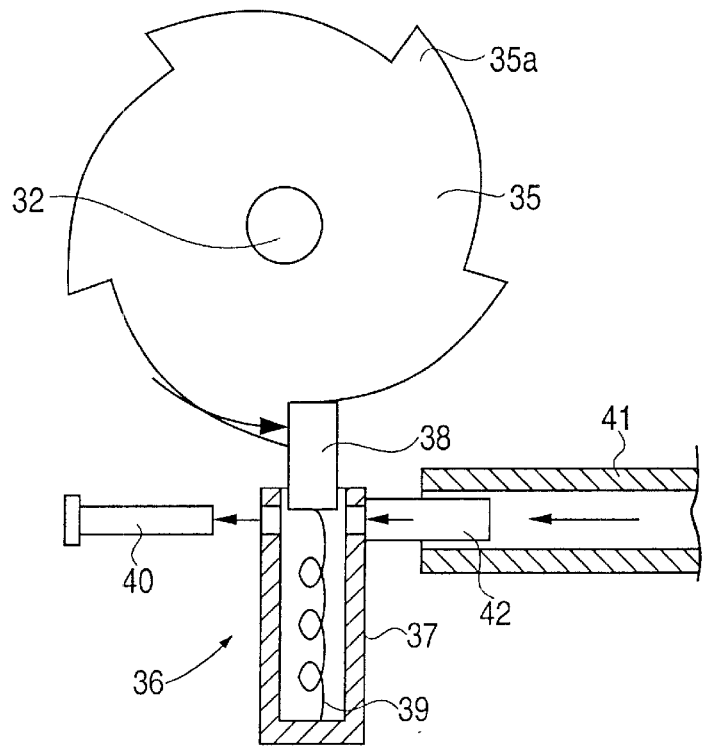

On the other hand, at least a portion of the exhaust gas generated by the pretensioner 11 can be made to pass through the guide tube 41 and is guided toward the piston 42 also, acting in the direction such that the piston 42 pops out from the guide tube 41 due to the exhaust gas. Due to the operation of this piston, the lock pin 40 is ejected as shown in FIG. 2(b), so the locking of the lock member 38 is disengaged, the lock member 38 ejects from the cylinder member 37 by the spring force of the spring 39, and reaches the engaging position. Then, as with the above-described case of a collision, the fourth gear 34 rotates due to the spool 4 rotating in the belt extracting direction CW via the second gear 31, so the lock wheel 35 rotates in the same direction as well. However, a ratchet claw 35a engages the lock member 38 immediately, so rotation of the lock wheel 35 in the belt extracting direction CW is obstructed. At this time, rotation of the lock wheel 35 in the belt take-up direction CW is permitted, due to the one-way clutch operation by the ratchet claws 35a.

Once rotation of the lock wheel 35 in the belt extracting direction CW is obstructed, the second torsion bar 32 twists over a length η which is shorter than the entire length θ thereof. Thus, the EA operation by the EA mechanism starts by the first torsion bar 7 twisting over the entire length thereof and the second torsion bar 32 twisting over a length η. The second torsion bar 32 breaks after twisting a predetermined amount, and following breaking of this second torsion bar 32, only the first torsion bar 7 twists. Accordingly, the EA load properties of the EA mechanism in this example at this time are a totaled constant load F2 of the EA loads of the first and second torsion bars 7 and 32 until the second torsion bar 32 breaks as shown in FIG. 3(b) (the portion of the second torsion bar 32 which twists is short, so this is greater than the constant load F1 in the event that the entire length twists as described above), and following breaking of the second torsion bar 32, this becomes a minimal constant load F3 consisting only of the EA load of the first torsion bar 7.

Thus, according to the seatbelt retractor 1 according to this example, the EA load can be switched to a different value during EA operation in relation to operation of the pretensioner 11 and the airbag, thereby allowing more appropriate adjustment for the restriction load placed on the seatbelt 3 while improving initial restriction of the passenger according to the pretensioner 11 and the airbag. Accordingly, for example, setting the arrangement such that this EA load switchover is matched or approximately matched to the point in time of the airbag reaching the passenger results in the restriction load placed on the seatbelt 3 being adjusted relatively great until the passenger hits the airbag so as to increase the initial restriction force of the passenger, and in the restriction load placed on the seatbelt 3 being adjusted relatively small at the point that the passenger hits the inflated airbag so as to decrease the restriction force of the passenger by the seatbelt 3, thereby allowing the airbag to sufficiently exhibit the restraining and protecting functions thereof, whereby the passenger restraining by the airbag and the passenger restraining by the seatbelt 3 can be combined in a more effective manner.

Incidentally, appropriately setting the position of the lock wheel 35, i.e., the length η of the second torsion bar 32 between the fourth gear 34 and the lock wheel 35, allows the EA load switchover point (switchover stroke) to be set arbitrarily.

Alternatively, providing a plurality of lock wheels 35 and sequentially delaying the obstructing of rotation of the lock wheels 35 in the belt extracting direction CW allows the EA load to be set at multiple loads, thereby allowing multi-step loads, and setting the length η between the fourth gear 34 and each lock wheel to vary for each lock wheel allows the various EA load switchover points (switchover strokes) to be set arbitrarily. In this case, the torsion bar part between the fourth gear 34 and the adjacent lock wheel breaks. Further differing the diameter of the torsion bar part between the fourth gear 34 and the adjacent lock wheel, the diameter of the torsion bar part between adjacent lock wheels, and the diameter of the torsion bar part between the third gear 33 and the adjacent lock wheel, allows various EA loads to be set, and also, of the portion bar portions between these, at least one torsion bar portion may be made to be a stepped bar with differing diameters, or tapered or curved shapes wherein the diameter continuously changes. Further, an arrangement may be made wherein, in the event that the second torsion bar 32 twists-deforms over the entire length thereof, the second torsion bar 32 breaks before the twisting operation of the first torsion bar 7 ends. In this case, the EA load switchover mechanism 36 is unnecessary.

Further, instead of operating the lock pin 40 with the exhaust gas of the pretensioner 11, an arrangement may be made to operate with electromagnetic means such as an electromagnetic solenoid or the like which operates with electric signals for operating the pretensioner 11 or airbag. Also, an arrangement may be made wherein the EA load is switched over by operating the lock pin 40 at the time of operating either one or the other of the pretensioner 11 and airbag.

Other operations and advantages of the seatbelt retractor 1 of this example are generally the same as those of the above-described conventional example.

As can be clearly understood from the above description, according to the seatbelt retractor of the present invention, the restriction load restricting the seatbelt is changed in multiple steps relating to the operation of at least one of the pretensioner and airbag, the restriction load placed on the seatbelt can be flexibly set variously according to the state at the time of emergency. That is to say, in the event of restraining the passenger in cooperation with at least one of the pretensioner and the airbag for example, the restriction load placed on the seatbelt can be adjusted more appropriately in accordance with the operation of at least one of the pretensioner and the airbag, by increasing the initial restriction of the passenger with the seatbelt, for example. Thus, the restriction load can be adjusted variously according to the restriction state of the passenger, thereby restraining the passenger in a more effective and appropriate manner.

We claim:

1. A seat belt retractor comprising:
   a rotatable spool for taking up a seatbelt;
   a first torsion bar connected to the spool and the lock mechanism to rotate therewith;
   a second torsion bar parallel to the first torsion bar and positioned to rotate with the spool, wherein the first and second torsion bars are not coaxial; and
   a locking mechanism preventing the rotation of one end of the torsion bars in the event of a first emergency situation;
      wherein the torsion bars are adapted to restrict the amount of load placed upon the seatbelt by twisting and deforming.

2. The retractor of claim 1, wherein the locking mechanism includes a locking base.

3. The retractor of claim 1, further comprising a second locking mechanism for preventing rotation of a portion of the second torsion bar.

4. The retractor of claim 3, wherein the second locking member is positioned between the ends of the second torsion bar.

5. The retractor of claim 4, wherein the second locking mechanism includes a clawed wheel secured to the torsion bar to rotate therewith.

6. The retractor of claim 5, wherein the second locking mechanism includes a lock member configured to engage the wheel and prevent rotation of the wheel in the event of a second emergency situation to thereby shorten the length of the portion of the second torsion bar that twists and deforms.

7. The retractor of claim 3, wherein the second locking mechanism is configured to be activated by a gas generator.

8. The retractor of claim 3, wherein the second torsion bar is configured to break prior to the first torsion bar in the event of an occurrence of a second emergency situation that activates the second locking mechanism.

9. The retractor of claim 1, wherein the retractor is configured to operate to restrict the load on the seatbelt in a series of steps.

10. The retractor of claim 9, wherein the retractor is configured so that the amount of load restricted is different in at least two of the series of steps.

11. The retractor of claim 8, wherein the retractor is configured so that the amount of load restricted changes due to the breaking of the second torsion bar.

12. The retractor of claim 3, wherein the second locking mechanism is configured to be activated after the first locking mechanism is activated.

13. The retractor of claim 8, wherein the second emergency situation causes the activation of an airbag.

14. The retractor of claim 1, wherein the first emergency situation causes the activation of a pretensioner.

* * * * *